United States Patent [19]

DeVault

[11] Patent Number: 5,999,486
[45] Date of Patent: Dec. 7, 1999

[54] METHOD FOR FRACTURE DETECTION USING MULTICOMPONENT SEISMIC DATA

[75] Inventor: Bryan C. DeVault, Groningen, Netherlands

[73] Assignee: Colorado School of Mines, Golden, Colo.

[21] Appl. No.: 09/121,757

[22] Filed: Jul. 23, 1998

[51] Int. Cl.[6] .................................................... G01V 1/30
[52] U.S. Cl. ................................ 367/36; 367/75; 367/37; 367/73; 364/421
[58] Field of Search .................................. 367/31, 47, 62, 367/75, 36, 37, 73, 421

[56] References Cited

U.S. PATENT DOCUMENTS

| 4,375,090 | 2/1983 | Thompson et al. | 367/73 |
|---|---|---|---|
| 4,398,273 | 8/1983 | Thompson et al. | 367/73 |
| 4,803,666 | 2/1989 | Alford | 367/36 |
| 4,817,061 | 3/1989 | Alford et al. | 361/75 |
| 5,136,554 | 8/1992 | Thomsen et al. | 367/75 |
| 5,596,547 | 1/1997 | Bancroft et al. | 367/51 |
| 5,712,829 | 1/1998 | Tang et al. | 367/75 |

OTHER PUBLICATIONS

Rüger, A., Center for Wave Phenomena, Reflection Coefficients and Azimuthal AVO Analysis in Anisotropic Media, pp. 1–131, Feb. 18, 1997, Arthur Lakes Library at Colorado School of Mines.

R.H. Tatham and M.D. McCormack, Multicomponent Seismology in Petroleum Exploration, pp. i–248, 1991, U.S.A.

*Primary Examiner*—Christine K Oda
*Assistant Examiner*—Anthony Jolly
*Attorney, Agent, or Firm*—Holme Roberts & Owens LLP

[57] ABSTRACT

The present invention provides a method for interpreting shear-wave seismic data to detect fractures in the subsurface of the earths crust. Seismic shear waves are acquired along medium symmetry planes and their corresponding AVO intercepts and gradients are estimated. The resulting AVO attributes are combined using a weighted least squares solution to estimate the change in splitting parameter and fast shear velocity, which are diagnostic of the presence of fractures. The method is also useful in assessing the porosity of the subsurface. Knowledge of subsurface fracturing and porosity is useful in locating, for example, oil and gas wells.

12 Claims, 5 Drawing Sheets

METHOD FOR FRACTURE DETECTION USING MULTICOMPONENT SEISMIC DATA

BACKGROUND OF THE INVENTION

The present invention relates to the field of geophysical exploration and more specifically to the detection of subsurface fractures with surface seismic data. The detection of fractures is of paramount importance in so-called "tight" petroleum reservoirs in which the primary determinant of well producibility is the presence of a connected network of fractures to convey fluid into the borehole. As is well known in the prior art, seismic shear waves are among the most sensitive tools available for detecting fractures in hydrocarbon reservoirs.

Previous shear-wave seismic acquisition and processing techniques have often relied on measurements of shear-wave splitting ("birefringence") to detect sub-surface fractures. To elaborate, aligned fractures induce horizontally-transverse anisotropy in the subsurface such that a vertically-incident shear wave splits into a fast mode polarized along the fracture direction and a slow mode polarized perpendicularly to the fractures. Shear waves are seismic vibrations that are polarized perpendicularly (or nearly perpendicularly in the case of an isotropic material) to their propagation direction, i.e., waves for which the vibrations occur perpendicularly to the direction of the wave's propagation. By measuring the shear-wave splitting (which is proportional to the velocity anisotropy), the location and density (the number of fractures per unit volume) of subsurface fracturing may be determined, because higher fracture densities cause a greater amount of shear-wave splitting. The use of four-component seismic acquisition (two orthogonal sources and two orthogonal receivers active during acquisition by both sources) is described in U.S. Pat. No. 4,803,666 to Alford, which is hereby incorporated by reference herein. Alford's technique entails the acquisition of a four-component data matrix to determine the symmetry planes of the medium. Alford describes the use of rotation algorithms to transform the seismic data into a symmetry-plane coordinate system which provides useful information about the orientation of the symmetry planes of the medium while also improving data quality. Knowledge of the orientation of the medium symmetry planes provided, e.g., by Alford rotation, is useful because the direction of open fracturing and that of the symmetry planes usually coincide. Measuring the symmetry plane orientation is therefore usually tantamount to measuring the fracture orientation, a parameter frequently difficult to determine from geological data and useful in reservoir management decisions.

A second consequence of horizontally transverse anisotropy caused by aligned vertical fracturing is a variation in seismic reflection amplitude at boundaries (such as a reservoir) as a function of profile azimuth caused by changes in the intensity of fracturing at the reflecting interface. This physical phenomenon enables fracture intensity to be ascertained with a relatively high vertical resolution by comparing the reflection amplitudes of the fast and slow shear-wave seismic sections. Both of these methods for fracture detection using shear-wave seismic data are described in detail in U.S. Pat. No. 4,817,061 to Alford et al., which is hereby incorporated by reference herein. Alford et al. describes the use of at least one source polarization along each source-receiver azimuth and receivers having matched polarizations.

However, these techniques may produce unsatisfactory results if the fracturing in the reservoir is relatively weak or if more than a single direction of open fracturing is present. Consequently, a method of seismic exploration which is able to characterize fracture intensity in the subsurface in even subtly fractured reservoirs would be advantageous.

Andreas Rüger, in his Ph.D. thesis, "Reflection Coefficients and Azimuthal AVO Analysis in Anisotropic Media", extended the theoretical treatment of split shear waves in the symmetry planes of a horizontally transversely isotropic ("HTI") medium or an orthorhombically anisotropic medium to the case of non-vertical incidence, deriving equations for the plane-wave reflection coefficients as a function of the waves' incident phase angle. This thesis is hereby incorporated by reference herein. AVO stands for amplitude variation with offset. At non-vertical incidence, i.e., by using offset seismic sources and receivers, it is possible to measure two additional amplitude attributes (reflection amplitude refers to the strength of the reflected signal observed at the receivers) in a seismic waveform, its reflection amplitude intercept and slope. The intercept is the projected zero-angle amplitude of the signal and provides information about the change in acoustic impedance and fracture density across the reflecting interface for shear waves. The reflection slope is the slope of a line fitted through the observed amplitudes as a function of the incidence angle of the waves and gives important information about the change in shear wave velocity and fracture intensity at the reflecting interface. This analytical insight into shear-wave reflection at non-normal incidence offers the possibility of obtaining more information about the elastic parameters (which are related to the fracture density) of the subsurface than previously possible if the numerous practical problems associated with the acquisition, processing, and interpretation of non-vertically-incident shear waves can be overcome.

SUMMARY OF THE INVENTION

The present invention is a novel method for acquiring, processing, and interpreting shear-wave seismic data for the purpose of detecting fractures and porosity in the subsurface of the earth's crust. The invention uses the change in shear-wave reflection amplitude as a function of the source-receiver distance (the "source-receiver offset" or "offset") to detect the presence and measure the intensity of fractures. The method includes the steps of acquiring shear-wave seismic data in symmetry planes of the subsurface and estimating the intercept and slope of the reflection amplitude with offset of each acquired data set for each time sample. During the aforementioned estimation step, variances (squared standard deviations) are computed for each slope and intercept at each time sample.

These variances are used in the following step to form weights for each slope and intercept of each shear-wave seismic reflection amplitude data set at each time sample. The weights and each slope and intercept value are then optimally combined at each time sample in a weighted least squares solution for a fracture density or intensity term $\Delta\gamma$, a shear-wave velocity contrast term $\Delta\beta/\beta$, and a density contrast term $\Delta\rho/\rho$. Contrast terms are the fractional change in a quantity at a reflection interface. The resulting seismic sections of each of these parameters are then interpreted to indicate areas of anomalously high fracture density in the direction of primary fracture orientation and other directions. The density contrast term $\Delta\rho/\rho$ is optionally interpreted to determine areas of higher porosity in the subsurface. Changes in the shear-wave velocity contrast term may indicate fractures that are open in a different direction from the predominant orientation. Consequently, this parameter is useful to ascertain whether or not two sets of open fractures are present.

DETAILED DESCRIPTION OF THE PREFERRED EMBODIMENTS

1. Brief theoretical background for subsurface fracture detection using shear-wave seismic data.

The presence and intensity of subsurface fracturing often exerts a strong control on the productivity of oil and gas wells in a variety of settings. Consequently, the detection of such fractures by remote means is of considerable industrial importance. As disclosed in U.S. Pat. No. 4,817,061, it has long been known that seismic shear waves (i.e. seismic energy polarized at angles which are perpendicular or nearly perpendicular to the direction of energy propagation) are very sensitive to the orientation and intensity of fractures in the subsurface of the earth. To interpret the response of these shear waves to fracturing, however, it is necessary to have a theoretical model of how the fractures influence the propagation of shear waves. Aligned fractures cause the host rock to behave in an anisotropic fashion, in which the velocities of both compressional and shear waves are a function of the angle of propagation of energy through the medium. The simplest and most common anisotropic model of fracturing is that of horizontal transverse isotropy (HTI), which can be caused, inter alia, by a single set of aligned, penny-shaped vertical fractures embedded in an isotropic rock matrix.

Figure 1:
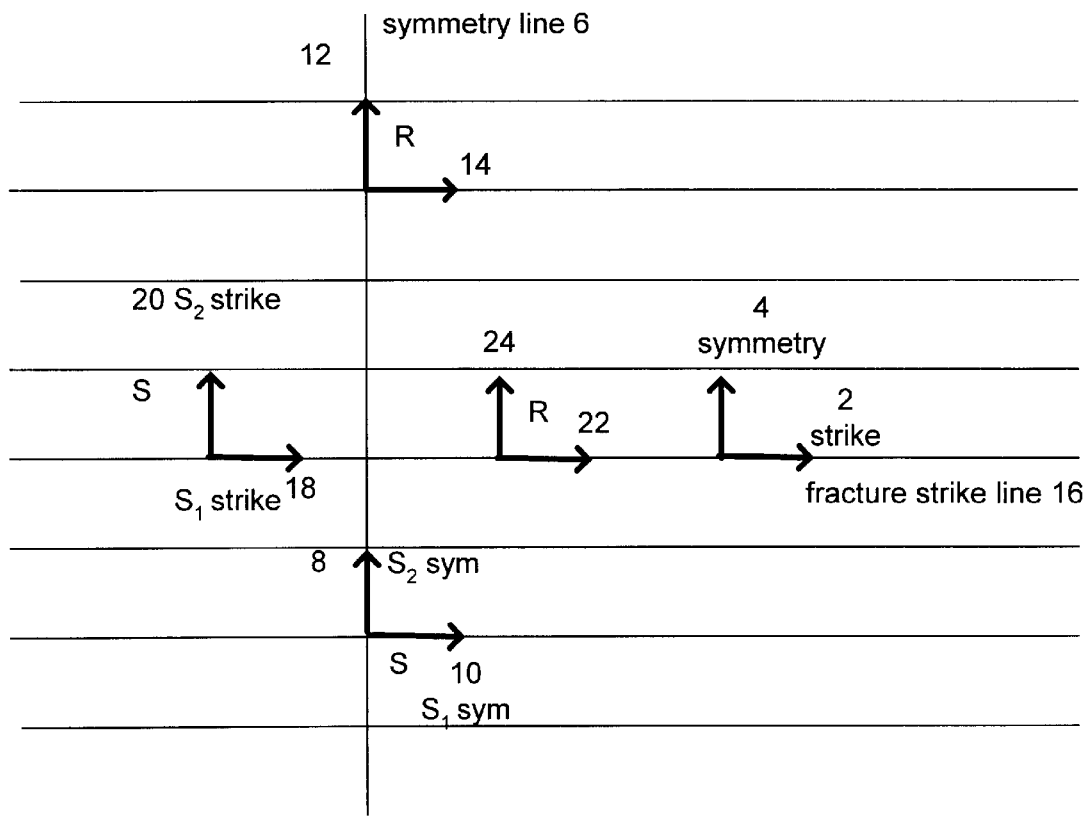
FIG. 1 is a plan view of an azimuthally-anisotropic subsurface model, indicating the direction of assumed vertical fracture orientation and diagrammatically illustrating a shear-wave seismic survey layout designed for sensing the intensity of vertical fractures.

As shown in FIG. 1, a horizontal slice of an azimuthally-anisotropic subsurface model, this anisotropic system imposes two symmetry planes on the subsurface. The first of these is the so-called "isotropy plane" or fracture-strike plane 2, which is a vertical plane along the direction of the (aligned) subsurface fracture set. Seismic waves that have a direction of propagation confined to this plane behave isotropically, i.e., with no variation in velocity as a function of propagation angle. The second plane, perpendicular to the fracture strike plane 2, is the so-called "symmetry plane" 4. It has long been known that information about the intensity of fracturing can be had by conducting shear-wave seismic surveys along the symmetry planes of the medium. The orientation of the symmetry planes may be determined by processing four-component seismograms by the method of Alford rotation described in U.S. Pat. No. 4,803,666 or by using other information such as borehole breakout or fracture orientation measurements from well-log data or azimuthal variations in the reflection signature of P-wave data, as is well known to those skilled in the art. The presence of aligned fractures gives rise to the well-known phenomenon of shear-wave splitting, in which two shear-waves propagate in the medium, a fast shear wave polarized along the direction of the fractures and a slow shear wave polarized perpendicularly to the fractures. The fractional difference in velocity between the two shear waves $\gamma$ is roughly proportional to the intensity of fracturing in an HTI medium. The acquisition, processing, and interpretation of shear-wave seismic surveys in such HTI media are discussed in *Multicomponent Seismology in Petroleum Exploration*, which is hereby incorporated by reference herein. The theoretical aspects of seismic wave propagation are discussed in Andreas Rüger's Ph.D. thesis, "Reflection Coefficients and Azimuthal AVO Analysis in Anisotropic Media", which is also hereby incorporated by reference herein. Additionally, as discussed in U.S. Pat. No. 4,817,061, the normal-incidence shear-wave reflection coefficients of the two modes differ by the change in the shear-wave splitting parameter $\Delta\gamma$ across the reflecting interface. Consequently, fracture detection may be performed over an HTI medium by examining either the difference in arrival time of the fast and slow shear-wave modes or by comparing the reflection amplitudes of the fast and slow shear-wave seismic sections at the level of interest. The use of the latter technique for fracture detection is described in "Prediction of lateral variability in fracture intensity using multicomponent shear-wave surface seismic as a precursor to horizontal drilling in the Austin Chalk", by M. C. Mueller, which is hereby incorporated by reference herein. It is important to understand that deviations from the assumptions used in such fracture detection algorithms, such as two or more aligned crack sets, dipping rather than vertical fracture sets, or an anisotropic rock matrix containing the cracks, will cause such techniques to produce erroneous results if these complications are not taken into account in processing the seismic data.

Shear-wave seismic surveys in the symmetry and isotropy planes of an azimuthally-anisotropic medium are described in U.S. Pat. No. 4,817,061. In the method described in that patent, a shear-wave survey line 6 aligned along the symmetry plane of the medium is laid out with paired in line and crossline sources 8 and 10 respectively. These are denoted as $S_1^{sym}$ and $S_2^{sym}$ in FIG. 1. These sources are matched with in line and crossline receivers 12 and 14 respectively. Another seismic line 16 may be situated along the fracture strike direction with in line and crossline sources 18 and 20 and matched receivers 22 and 24 as well. The seismic acquisition is conducted by activating the in line source 8 and recording on in line receiver 12. The matched crossline source-receiver pair 12 and 14 may then be activated, and the matched in line source-receiver pair 18 and 22 and crossline source-receiver pair 20 and 24 may also be activated if a strike-line survey is also being conducted. These steps are repeated at a plurality of locations along the seismic lines to create multichannel common-midpoint lines of seismic data containing a plurality of source-receiver offsets. Four-component data acquisition (e.g. recording on both receiver pairs 12 and 14 and 22 and 24 during activation of each source 8, 10, and 28 and 20) may also be done for quality control purposes or to more accurately establish the orientation of the symmetry and isotropy planes 4 and 2. The resulting seismograms are than processed in a conventional way well understood by those skilled in the art by, for example, applying amplitude recovery corrections, static time corrections in both shot and receiver domain, normal-move out corrections, and any amplitude-preserving noise suppression to emphasize the primary seismic reflections which are of interest while removing undesirable noise from the seismograms. The seismograms are usually then stacked and the reflection amplitudes and travel times of the fast and slow shear-wave seismic sections are then compared, as described in detail in U.S. Pat. No. 4,817,061, which is incorporated by reference herein.

The method for fracture detection disclosed in U.S. Pat. No. 4,817,061 encompasses near-normal-incidence illumination of the subsurface, e.g., with closely-spaced sources and receivers. While it is possible to extract much useful information regarding the fracture properties of the subsurface with such seismic surveys, it is advantageous to utilize variations in the shear-wave seismic reflectivity of the subsurface as a function of offset (or, equivalently, incidence angle) to obtain more information about fracturing. Andreas Rüger, in his Ph.D. thesis, "Reflection Coefficients and Azimuthal AVO Analysis in Anisotropic Media", derived linearized plane-wave reflection coefficient equations for the $S_1^{sym}$, $S_2^{sym}$, $S_1^{strike}$, and $S_2^{strike}$ shear waves in an HTI medium. These equations are valid if the contrasts in velocities and anisotropies between the incident and reflecting media are small and if the incident angle is small or moderate (less than the critical angle and generally less than 30–40 degrees). The plane-wave reflection coefficients are:

$$R_{S2}^{strike}(\theta) = -\frac{1}{2}\left(\frac{\Delta\beta}{\beta}+\frac{\Delta\rho}{\rho}-\Delta\gamma\right)+\frac{1}{2}\left(\frac{\Delta\beta}{\beta}-\Delta\gamma\right)\tan^2\theta \quad \text{(EQ 1)}$$

$$R_{S1}^{strike}(\theta) = -\frac{1}{2}\left(\frac{\Delta\beta}{\beta}+\frac{\Delta\rho}{\rho}\right)+\left(\frac{7}{2}\cdot\frac{\Delta\beta}{\beta}+2\cdot\frac{\Delta\rho}{\rho}\right)\sin^2\theta$$

$$R_{S1}^{sym}(\theta) = -\frac{1}{2}\left(\frac{\Delta\beta}{\beta}+\frac{\Delta\rho}{\rho}\right)+\frac{1}{2}\left(\frac{\Delta\beta}{\beta}-\Delta\gamma\right)\tan^2\theta$$

$$R_{S1_\perp}^{sym}(\theta) = -\frac{1}{2}\left(\frac{\Delta\beta}{\beta}+\frac{\Delta\rho}{\rho}-\Delta\gamma\right)+\left[\frac{7}{2}\left(\frac{\Delta\beta}{\beta}-\Delta\gamma\right)+\frac{2\Delta\rho}{\rho}+\frac{1}{2}\left(\frac{\alpha}{\beta}\right)^2(\Delta\varepsilon^{(v)}-\Delta\delta^{(v)})\right]\sin^2\theta$$

It can be seen from these equations that much useful information is contained in the non-normal-incidence or slope reflection terms (the terms which are a function of the incidence phase angle $\theta$). The other terms, i.e., the terms that are not a function of the incidence phase angle $\theta$, are the intercepts. Techniques for estimating the normal-incidence reflection coefficient and slope term (the term which is a function of the incident phase angle $\theta$) from seismic data are described in detail in *Offset-dependent reflectivity: Theory and Practice of AVO analysis*, which is hereby fully incorporated by reference herein. Heretofore, seismic AVO analysis has focused on estimating the AVO slope and intercept on conventional, P-wave seismic data for detecting hydrocarbons and lithology changes, rather than from shear waves for fracture detection. However, estimating shear-wave AVO intercepts and gradients involves the same procedure of line fitting as will be described in the following section. The present invention puts these computed shear-wave AVO intercepts and slopes to the novel use of weighted least squares fracture detection. It is apparent from Equation I that if all AVO intercepts and slopes are known, the resulting system of equations contains more equations than unknowns. Because the system is redundant, it is advantageous to use a weighted least squares solution technique described below to estimate the elastic constants $\Delta\beta/\beta$, $\Delta\rho/\rho$, and the anisotropy parameter $\Delta\gamma$.

2. Seismic fracture detection using weighted least squares AVO analysis.

Figure 2:
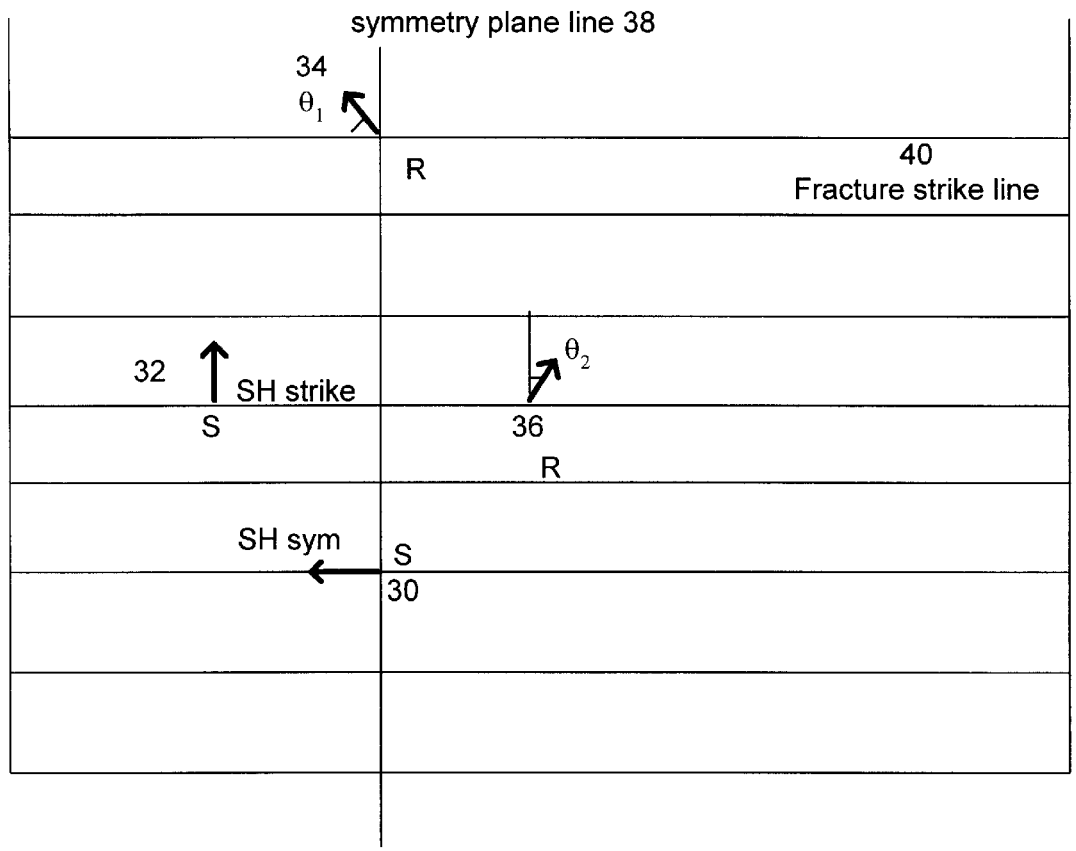
FIG. 2 is a plan view of an alternate embodiment of the seismic survey layout illustrated in FIG. 1, indicating the direction of fracture orientation and diagrammatically illustrating a second shear-wave seismic survey layout for sensing the intensity of vertical fractures in the subsurface.

The method of the present invention for detecting fractures using shear-wave AVO analysis may be performed using conventional azimuthal shear-wave seismic surveys illustrated in FIG. 1, or, in an alternate embodiment of the invention illustrated in FIG. 2, by laying out sources 30 and 32 and receivers 34 and 36 in lines 38 and 40 along the symmetry and isotropy planes respectively. A single source (30 or 32) is oriented along or perpendicular (the configuration illustrated in FIG. 2) to the line and the receivers may be oriented at an angle (respectively $\theta_1$ for receiver 34 and $\theta_2$ for receiver 36) to the source. The receivers may also be aligned with the sources. If the receivers are oriented at an angle $\theta_1$ to the source, the component of the reflection amplitude in the direction of the source polarization is $$R = R_0 \cos\theta_1 \quad \text{(EQ 2)}$$

In the embodiment illustrated in FIG. 2, both the symmetry plane and isotropy plane surveys utilize SH (i.e., transverse to the direction of the line) source polarizations. If the azimuthal orientation of the symmetry planes is known from other information, it is not necessary to conduct either four-component acquisition (as described in U.S. Pat. No. 4,803,666) or to match the polarization of sources and receivers (as described in U.S. Pat. No. 4,817,061). As described in detail below, the use of transverse polarization along both directions suffices to both determine the intensity of subsurface fracturing oriented along the fracture strike direction 4 and provide some information about potential fracturing in other directions as well. As is well understood by those skilled in the art, the source and receiver lines may be laid out in 3-D seismic acquisition geometries to maximize coverage of the subsurface in all three coordinates.

Figure 3:
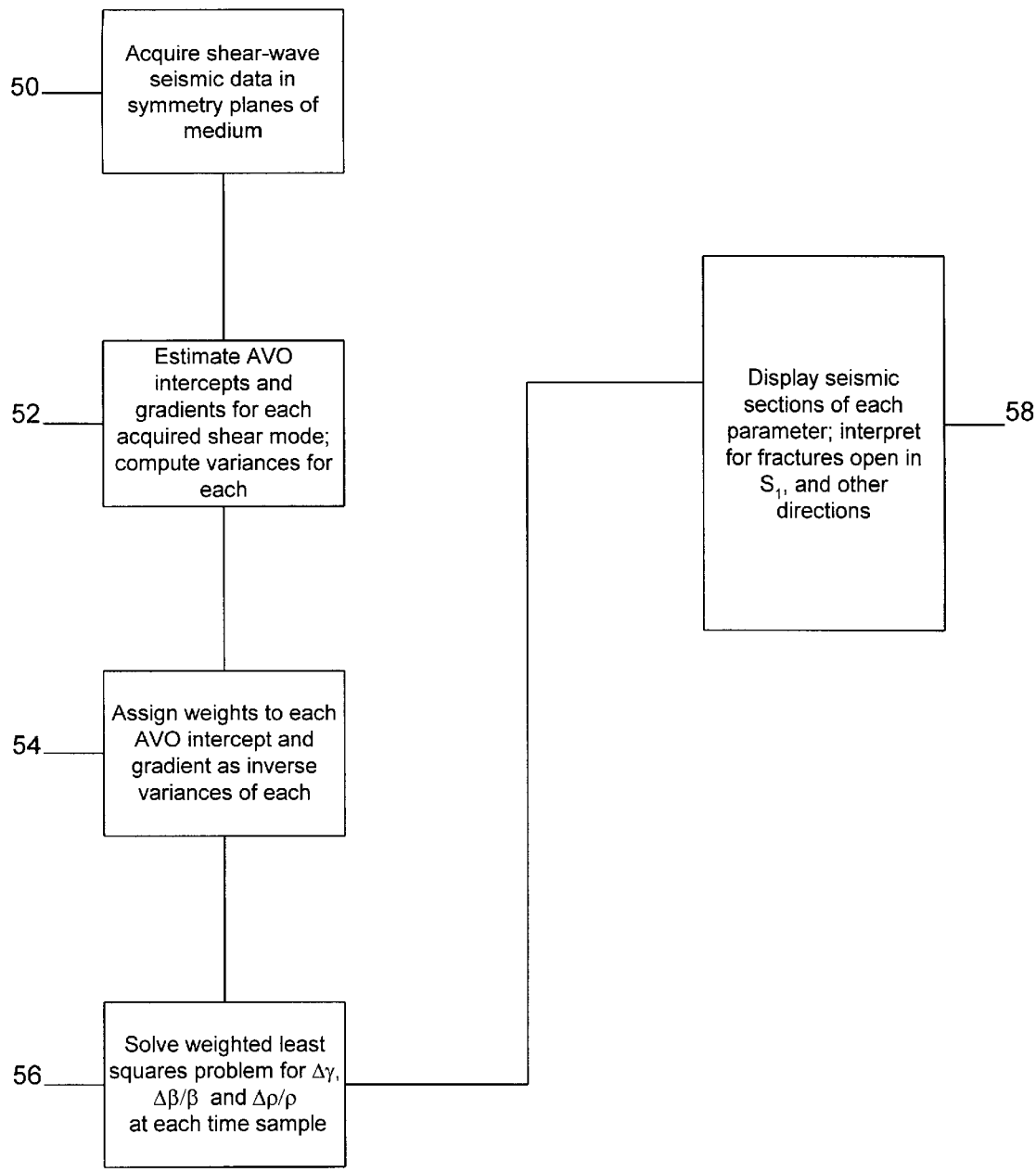
FIG. 3 is a block diagram illustrating the steps utilized in processing the shear-wave seismic data for detecting fractures according to the technique of the present invention.

A schematic diagram of the seismic data processing flow utilized in the preferred embodiment of the present invention is illustrated in FIG. 3. The data acquisition step 50 described above includes acquiring shear-wave reflection data in the symmetry planes of the medium, which may either be known a priori or determined by Alford-style rotation analysis. As described above, the acquisition of a single component (e.g. the SH mode) of shear-wave polarizations in each of the symmetry planes is sufficient for the fracture detection method of the present invention to succeed. However, if added redundancy in the form of additional measurements is desired, it is also possible to acquire both source and receiver polarizations (e.g. 18, 20, 22, and 24 in FIG. 1) concurrently.

Subsequently to acquisition of the seismic data, the measurements are preprocessed for AVO analysis in a manner well known to those skilled in the art. Such processing may include, for example, the steps of true amplitude recovery, surface-consistent statics and deconvolution, velocity analysis and normal move out correction, Q compensation, and prestack time migration. After this preprocessing, the data are sorted into the common midpoint domain and their AVO intercepts and gradients (for each shear-wave mode acquired) estimated by linear regression well understood by those of ordinary skill in the art, as illustrated in step 52. In the preferred embodiments of the present invention, the incident phase angle $\theta$ is computed by either raytracing through an interval velocity model of the subsurface or assuming a straight raypath connecting source and receiver.

Concurrently with estimation of each AVO intercept and gradient, variances for each intercept and gradient are computed. The inverse of these variances are assigned as weights (step 54) to the subsequent weighted least squares solution of the plane-wave reflection coefficients given in Equation 1.

Because there are typically more equations than unknowns in the plane-wave reflection coefficient equations (Equation 1) for the seismic survey acquisition techniques illustrated in FIGS. 1 and 2, a weighted least squares solution of these equations may advantageously be made to both utilize all available information on the offset-dependent reflection coefficient acquired during seismic surveying and to optimally estimate the quantities of interest, particularly the fracture density term $\Delta\gamma$. Weighted least squares solution techniques differ from conventional least squares estimation in that the problem to be solved, which may be conveniently written as $$\vec{Y} = \underline{X}\underline{B} + \vec{e} \qquad \text{(EQ 3)}$$

(where the vector Y is observed data (here, each shear-wave AVO intercept and gradient), X is the matrix relating Y to the variables of interest B, and e is the vector of noise or uncertainty in the measurements Y), has known values of the noise e. Because the values of e are computed in step 54 when the measurement variances are computed, the weighted least squares solution to the problem is $$\underline{B}^* = (\underline{X}^T \underline{V}^{-1} \underline{X})^{-1} \underline{X}^T \underline{V}^{-1} \underline{Y} \qquad \text{(EQ 4)}$$

where B* is the estimate of the desired quantities and V is a diagonal matrix, the entries of which are precisely the inverse weights computed in step 54. A thorough mathematical description of weighted least squares regression analysis is given in Seber, *Linear Regression Analysis*, which is hereby incorporated by reference herein.

The technique of weighted least squares analysis is particularized to the problem of multi-component AVO analysis as follows. If the AVO intercepts and gradients are written with $A_{S1}^{sym}$ being $^1A$, $A_{S2}^{sym}$ being $^2A$, $A_{S2}^{strike}$ as $^3A$, and $A_{S1}^{strike}$ as $^4A$, and the same convention is adopted for each gradient, i.e., $B_{S1}^{sym}$ being $^1B$ and $B_{S2}^{strike}$ being $^3B$, the system of Equation 3 becomes $$\begin{bmatrix} ^1A \\ ^1B \\ ^2A \\ ^3A \\ ^3B \\ ^4A \end{bmatrix} = \begin{bmatrix} -\frac{1}{2} & -\frac{1}{2} & 0 \\ \frac{1}{2} & 0 & -\frac{1}{2} \\ -\frac{1}{2} & -\frac{1}{2} & \frac{1}{2} \\ -\frac{1}{2} & -\frac{1}{2} & \frac{1}{2} \\ \frac{1}{2} & 0 & -\frac{1}{2} \\ -\frac{1}{2} & -\frac{1}{2} & 0 \end{bmatrix} \begin{bmatrix} \frac{\Delta\beta}{\beta} \\ \frac{\Delta\rho}{\rho} \\ \Delta\gamma \end{bmatrix} \qquad \text{(EQ 5)}$$

where $\Delta\beta/\beta$ is the fractional change in the fast shear-wave velocity at the interface of interest, $\Delta\rho/\rho$ is the fractional change in density, and $\Delta\gamma$ is the change in the shear-wave splitting parameter. In Equation 5, the SV-mode AVO gradients, i.e., the terms that are a function of $\sin^2\theta$, are not employed due to anisotropy-related overburden focusing effects which tend to render the SV gradient measurement unreliable. If the subscripts for each of the weights $w_i$ (computed in step 54 by forming the inverse variance of each AVO intercept and gradient) are designated in the order in which the corresponding AVO intercepts and gradients appear on the left hand side of Equation 5, the solution for the fracture density term $\Delta\gamma$ using the weighted least squares Equation 4 is then $$\Delta\gamma^* = \frac{E}{F}, \quad \text{where} \qquad \text{(EQ 6)}$$

$$F = w_1 w_2 w_3 + w_1 w_2 w_4 + w_1 w_3 w_5 + w_1 w_4 w_5 + w_2 w_3 w_6 + w_2 w_4 w_6 + w_3 w_5 w_6 + w_4 w_5 w_6$$

and $$E = 2[-w_1 w_2 w_3 (^1A - ^2A) + w_2 w_1 w_4 (^1A + ^3A) + w_1 w_3 w_5 (^2A - ^1A) + w_1 w_4 w_5 (^3A - ^1A) \qquad \text{(EQ 7)}$$

$$+ w_2 w_3 w_6 (^2A - ^4A) + w_2 w_4 w_6 (^3A - ^4A) + w_3 w_5 w_6 (^2A - ^4A) + w_4 w_5 w_6 (^3A - ^4A)]$$

Missing AVO attributes, e.g. from unacquired modes or components, are assigned a weight of zero in Equations 6 and 7. In the preferred embodiment, this solution (and the corresponding solutions for the density and fast shear-wave velocity contrast terms) is computed from the AVO intercepts and gradients and their corresponding weights computed at step 54 in a solution step 56 for each time sample. The result is preferably a set of 2-D or 3-D seismic data volumes of the contrast parameters which contain information about the fracture intensity, shear-wave velocity change, and density change. At step 56, the standard deviations for each quantity of interest are also preferably computed. The standard deviation of the fracture intensity $\Delta\gamma$ term is the square root of its variance, $$\sigma_\gamma^2 = 4 \left[ \frac{w_1 w_2 + w_2 w_3 + w_2 w_4 + w_1 w_5 + w_3 w_5 + w_4 w_5 + w_2 w_6 + w_5 w_6}{F} \right] \qquad \text{(EQ 8)}$$

Following the computation step 56, displays of each of the contrast parameters $\Delta\beta/\beta$, $\Delta\rho/\rho$, and $\Delta\gamma$ are then made (step 58) and interpreted for the presence of fracturing and/or porosity.

Figure 4:
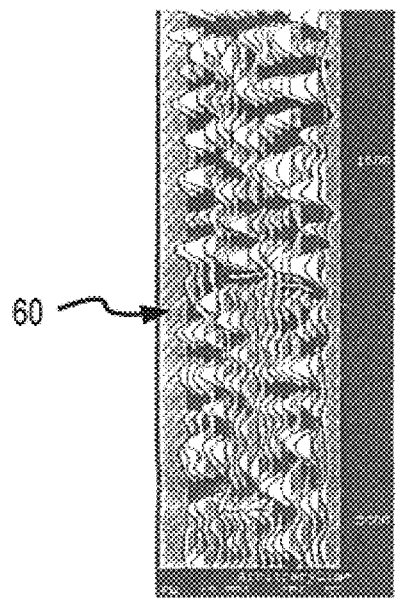
FIG. 4 is a sample seismic section of the shear-wave splitting parameter $\Delta\gamma$ generated by the methods of the present invention.
Figure 5:
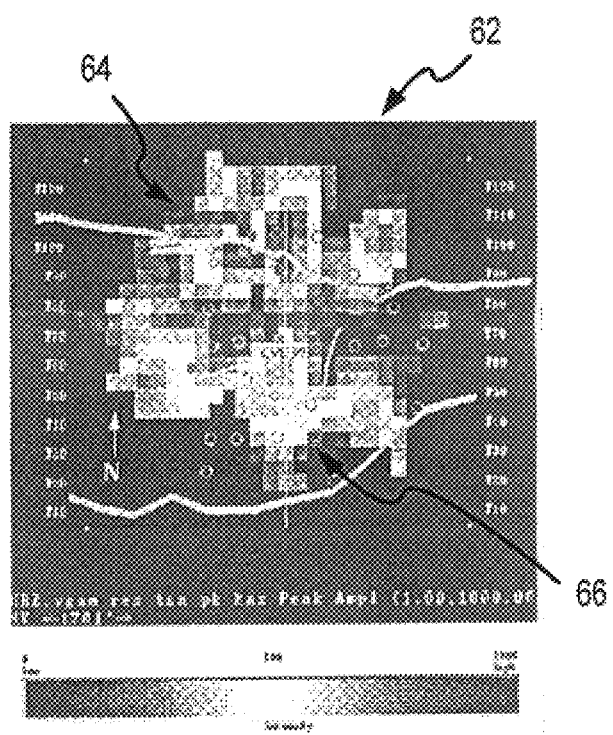
FIG. 5 is a map view of the amplitude of a $\Delta\gamma$ stack generated by the methods of the present invention over a known, fractured petroleum reservoir indicating the intensity of open fractures in the direction of maximum principal horizontal compressive stress.

FIG. 4 illustrates one such display, a display 60 of the computed change in shear-wave splitting parameter $\Delta\gamma$. As is well known to those of ordinary skill in the art, events corresponding to reflections from, e.g., hydrocarbon reservoirs, may readily be identified by their time values as interpreted from conventional seismic data. Mapping the amplitude of reservoir events on fracture intensity displays such as the display 60 computed from multicomponent weighted least squares AVO analysis allows lateral changes in the amount of fracturing in the reservoir to be detected. One such map, made from a Permian Basin San Andres carbonate oil reservoir, is shown in FIG. 5, as display 62. An area of anomalously high fracture intensity is indicated at location 64 near a prominent fault bend. Another location of anomalously intense fracturing is indicated to the south of a $CO_2$ injection well at location 66.

Figure 6:
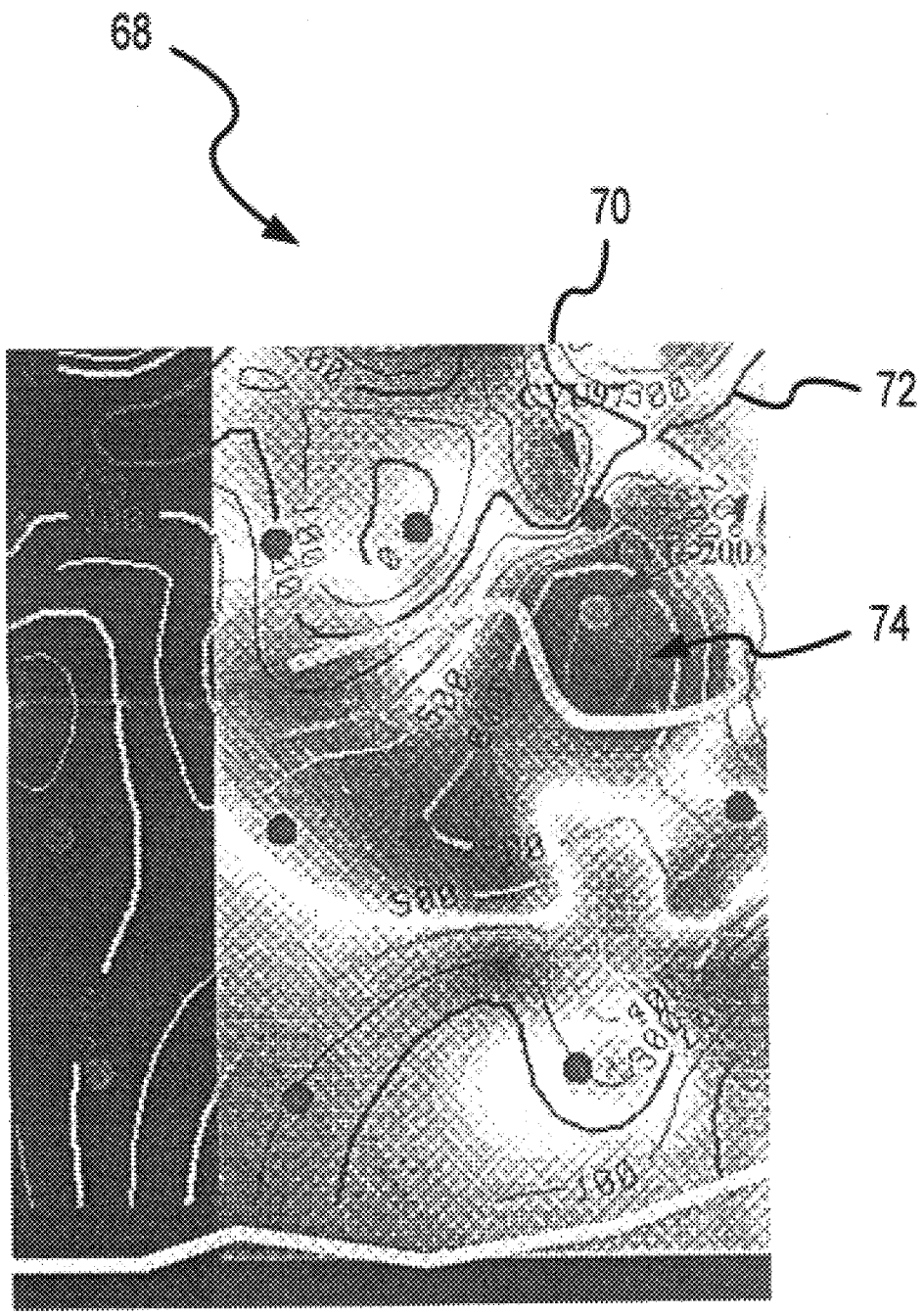
FIG. 6 is a map view of the amplitude of the attribute $\Delta\beta/\beta$ generated by the technique of the present invention over a known, fractured petroleum reservoir indicating the intensity of fractures open in directions other than the direction of maximum principal horizontal compressive stress.

An advantageous feature of the present invention is its ability to distinguish fractures open in the dominant direction from fractures open in other directions. This is accomplished by comparison of the change in splitting parameter $\Delta\gamma$ (which detects changes in fracturing open in the dominant direction) with the change in shear-wave velocity $\Delta\beta/\beta$. As is well known to those skilled in the art, the presence of fractures aligned in directions other than the dominant direction causes a decrease in the fast shear wave velocity $\beta$ with respect to the unfractured rock. It is this decrease that is detected in the contrast term $\Delta\beta/\beta$ by the weighted least squares AVO analysis methods of the present invention. Consequently, the presence of significant open fracturing in the dominant direction can be detected by examining displays such as 60 and maps such as 62 of the change in the splitting parameter. The presence of fracturing open in all other directions is indicated by anomalies in the shear-wave velocity contrast term. Both displays may advantageously be combined on a single image, such as the display 68 illustrated in FIG. 6. The display 68 includes a section 70 of the intensity of the change in the fast shear-wave velocity $\Delta\beta/\beta$, and is overlain by contours 72 of the splitting parameter term $\Delta\gamma$. Areas where both quantities are relatively large compared to their surroundings often denote areas where fractures are open in both the dominant and other directions. One such area 74 is shown to the south of the injection well CVU-97, where a time-lapse anomaly related to carbon dioxide injection at that well was observed on conventional shear-wave seismic data.

Changes in the density contrast term $\Delta\rho/\rho$ computed by the methods described above may be mapped within hydrocarbon reservoirs according to the method of the present invention to detect variations in reservoir porosity in a fashion analogous to that used to detect areas of fracturing in the reservoir.

While Equations 5–8 assume an HTI symmetry of anisotropy in the subsurface, it should be understood that analogous equations may be derived in a straightforward fashion for orthorhombic symmetry as well, using anisotropy parameters developed by Tsvankin in his paper "Anisotropic parameters and P-wave velocity for orthorhombic media", which is hereby incorporated by reference herein. Reflection coefficient equations for such a medium are given in Rüger, "Reflection Coefficients and Azimuthal AVO Analysis for Anisotropic Media". The resulting seismic sections are interpreted for the presence of fracturing in a completely analogous fashion.

Having disclosed the fundamental concept of the present invention, it will be obvious to those skilled in the art that variations or modifications thereto can be obtained without departing from the scope of the claimed invention.

What is claimed is:

1. A method for obtaining information relating to fractures in the earth's subsurface, comprising the steps of:
    acquiring multi-channel, multi-offset shear-wave seismic data for at least one shear wave mode along the symmetry planes of the subsurface at a plurality of subsurface locations;
    processing said seismic data for said at least one shear wave mode to form estimates of AVO intercepts, AVO gradients and AVO weights for said AVO intercepts and AVO gradients; and
    combining said estimates of AVO intercepts, AVO gradients and AVO weights to form estimates of the change in fracture intensity and the change in fast shear-wave velocity at a subsurface location sampled by said seismic data.

2. A method for obtaining information relating to fractures in the earth's subsurface, the method comprising the steps of:
    acquiring multi-channel, multi-offset shear-wave seismic data for at least one shear wave mode along the symmetry planes of the earth's subsurface at a plurality of subsurface locations;
    processing said seismic data for said at least one shear wave mode to form estimates of AVO intercepts, AVO gradients and AVO weights for said AVO intercepts and AVO gradients;
    using said estimates of AVO intercepts, AVO gradients and AVO weights to estimate a parameter that relates to fracturing at a subsurface location sampled by said seismic data; and
    identifying, using said estimate of said parameter, an area of a preferred type of fracturing.

3. A method, as claimed in claim 2, wherein:
    said step of processing includes one of the following true amplitude recovery, surface-consistent statics and deconvolution, velocity analysis and normal move out correction, Q compensation, and prestack time migration.

4. A method, as claimed in claim 2, wherein:
    said step of processing includes determining variances of each of said estimated AVO intercepts and AVO gradients.

5. A method, as claimed in claim 4, wherein:
    said step of processing includes inverting each of said variances to obtain said AVO weights.

6. A method, as claimed in claim 2, wherein:
    said step of using includes performing a weighted least squares solution.

7. A method, as claimed in claim 2, wherein:
    said step of using includes determining one of a change in fracture density and a change in fast shear-wave velocity.

8. A method, as claimed in claim 2, wherein:
    said step of using includes determining a parameter relating to the porosity at each of said subsurface locations.

9. A method for locating fractures in the earth's subsurface, the method comprising the steps of:
    identifying a volume of earth with a surface that defines the boundary between said volume of earth and one of the atmosphere and a body of water;
    wherein said volume of earth contains an oil/gas reservoir that underlies said surface;
    acquiring multi-channel, multi-offset shear-wave seismic data for at least one shear wave mode along the symmetry plane of the volume of earth's subsurface at a plurality of subsurface locations;
    locating a point on the surface from which a fracture area that permits access to said reservoir can be reached, wherein said fracture area having been previously identified with estimated AVO intercepts and AVO gradients of said seismic data and AVO weights of each of said estimated AVO intercepts and gradients.

10. A method, as claimed in claim 9, further comprising:
    excavating from said point on said to surface to said fracture area to obtain access to said oil/gas reservoir.

11. A method, as claimed in claim 1, wherein:
    said step of combining includes using a weighted least squares solution of the plane-wave linearized shear wave reflection coefficient equations.

12. A method, as claimed in claim 2, wherein:
    said step of using includes forming said AVO weights as the inverse variance in each of said AVO intercepts and AVO gradients and combining said AVO intercepts, AVO gradients, and AVO weights to form a weighted least squares solution of a linearized plane-wave shear-wave reflection coefficients.

* * * * *